Nov. 22, 1955　　　W. C. EWALDSON　　　2,724,380
ARTICLE CUTTING APPARATUS

Filed April 22, 1953　　　　　　　　　4 Sheets-Sheet 1

INVENTOR
W. C. EWALDSON
BY
ATTORNEY

INVENTOR
W. C. EWALDSON
BY *[signature]*
ATTORNEY

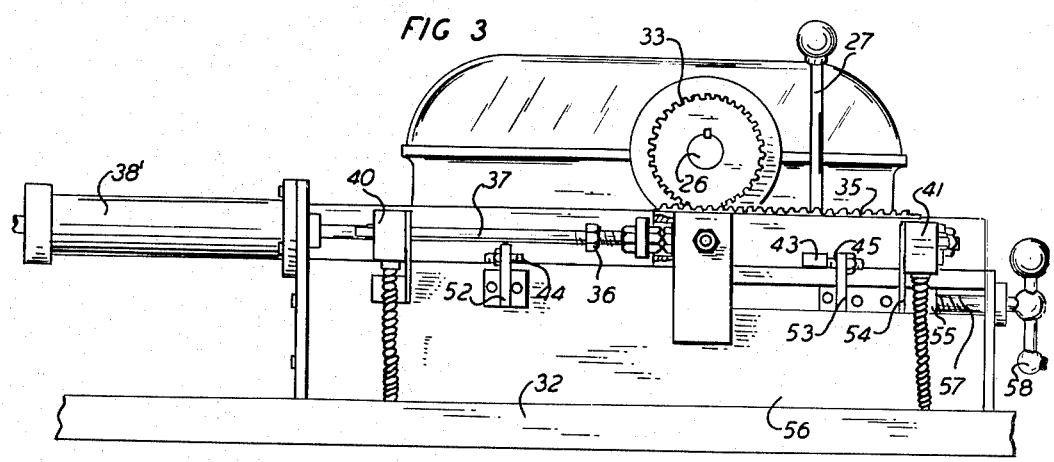
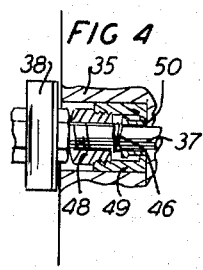
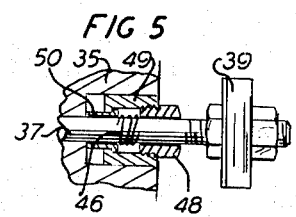
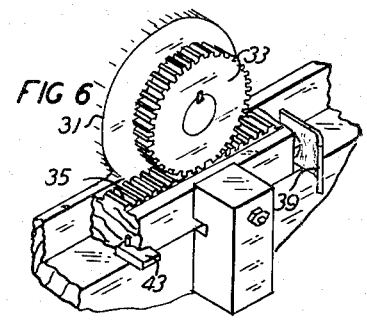
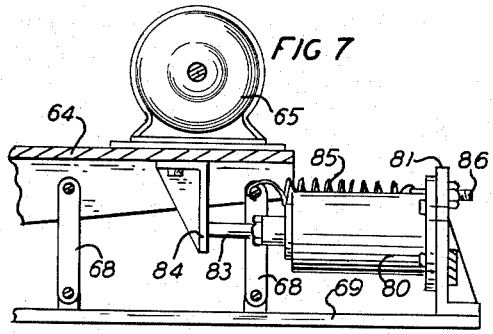

United States Patent Office 2,724,380
Patented Nov. 22, 1955

2,724,380
ARTICLE CUTTING APPARATUS
Waldemar C. Ewaldson, Millington, N. J., assignor to Western Electric Company, Incorporated, New York, N. Y., a corporation of New York Application April 22, 1953, Serial No. 350,474
9 Claims. (Cl. 125—14)

This invention relates to apparatus for cutting articles and more particularly to apparatus for cutting less than the full circumference of cylindrical articles.

In the manufacture of certain electrical units, cylindrical articles provided with a certain number of projections at one end thereof are to be used as cores for coils. In one instance, it was found desirable for these cores to be formed of an extremely hard and brittle material such as fused quartz. To produce these cores with the desired projections, it was determined that cuts of given depths could be made in one end of each cylindrical article to outline the projections but a difficult problem arose regarding the removal of the excess material of the adjacent end of each article.

The object of the present invention is an apparatus adapted to cut excess material from the articles.

In accordance with the object of the invention, the apparatus includes a chuck adapted to removably hold an article relative to a rotatable cutter and to rock the article less than a complete cycle to cause cutting of the article.

In the present embodiment of the invention, the cutter is supported for movement relative to the chuck, and during each rocking movement of the chuck with the article, a fluid operated unit advances the cutter a measured distance until the desired depth is reached.

Other objects and advantages will be apparent from the following detailed description when considered in conjunction with the accompanying drawings wherein:

Fig. 3 is a side elevational view of the apparatus looking toward the left side of Fig. 1;

Fig. 4 is a fragmentary sectional view of one portion of the chuck moving mechanism;

Fig. 5 is a fragmentary sectional view of another portion of the chuck moving mechanism;

Fig. 6 is a fragmentary isometric view of a portion of the chuck moving mechanism;

Fig. 7 is a fragmentary vertical sectional view of the cutter supporting and moving means;

Figure 14:
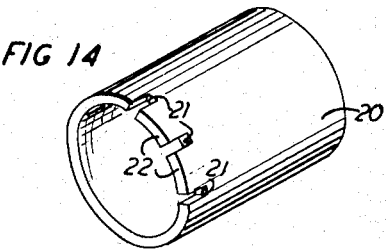
Fig. 14 is an isometric view of one of the articles after it has been notched but before being processed by the apparatus.
Figure 15:
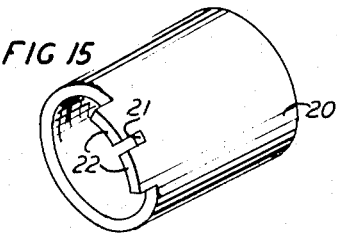
Fig. 15 is an isometric view of the completed article.

Referring now to the drawings, attention is first directed to Fig. 14 which illustrates an article 20 which, in the present embodiment of the invention, is cylindrical in general contour, of a given length, formed of fused quartz and having spaced notches 21 cut therein to provide adjacent projections 22. Drawing attention to both Figs. 14 and 15, it will be observed that the notches 21 are of a given depth and that the problem of the apparatus is the removal of the material of the article 20 at the notched end to the depth of the notches 21 without disturbing the projections 22 in any way. This is accomplished by rocking the article shown in Fig. 14, about its center relative to a cutter or to move a cutter in a path about the article between limits governed by the positions with the projections 22.

In the present embodiment of the invention the apparatus provides a chuck 25 of a commercially known type having the conventional resilient jaws adapted to grip the article 20 and hold it at a given position with its center line coincident with the axis of the chuck and a spindle 26 upon which the chuck is mounted. The jaws of the chuck are normally closed on the article in the conventional manner and are movable into open position by the actuation of the conventional hand lever 27 and the associated mechanism not shown. The details of the chuck are not believed essential for a clear understanding of the invention, it being important to realize that the chuck is of the well known type and that it is provided with a conventional locating element to position the article relative to a cutter 30.

The spindle 26, of the chuck 25, is rotatably supported in a suitable bearing 31, mounted on a base 32 and having a pinion 33 mounted on the outer end of the spindle. The pinion 33 is operatively connected to a mechanism adapted to rock the chuck between varied limits. This means includes a rack 35, supported at 36, for movement in a guided path and connected to a piston rod 37 of a piston, not shown, in a fluid cylinder 38'. In the present embodiment of the invention, the piston rod 37 extends through a hollow portion of the rack 35 and carries switch actuating members 38 and 39 at variable positions to operate switches 40 and 41, respectively.

The structures, shown in Figs. 4 and 5, represent cushioning means whereby the piston rod 37 may move the rack in either direction until a projection 43 thereon engages either an adjustable stop 44 or an adjustable stop 45 after which springs 46, adjacent the end being pushed, may be compressed, allowing additional movement of the piston rod to cause either projection 38 or 39 to operate the switch 40 or 41. It will be noted that the springs 46 normally urge members 48 and 49 outwardly controlled by the collars 50 as illustrated in Fig. 5. However, when movement of the rack 35 is stopped, the adjacent member 38 or 39, or more particularly the adjacent lock-nuts securing these members to the piston rod and engaging the member 48 of the end of the rack being pushed, will be forced inwardly with the member 49 against the force of its spring 46.

The stops 44 and 45 determine the limits of the rocking movement of the chuck and the article. The adjustable stop 44 is mounted in a fixed position bracket 52 relative to the fixed position switch 40. The stop 45 is mounted on a bracket 53 while this bracket and a bracket 54 supporting the switch 41, are mounted on a slide 55 of a support 56. The slide is adjustable to move the stop 45 and switch 41 relative to the stop 44 and switch 40 through the rotation of an adjusting screw 57 assisted by a hand crank 58.

The cutter 30 is mounted on one end of a spindle 60 which is journalled in suitable bearings (not shown) disposed in a housing 61 and having a pulley 62 mounted on the opposite end thereof. The housing 61 is mounted in brackets 63 which are supported by a table 64 upon which an electric motor 65 is mounted. The motor 65 has a pulley 66 mounted on its shaft and operatively connected to the pulley 62 by a belt 67. The table 64 is mounted on the upper ends of two pairs of pivotal legs 68, the lower ends of the legs being pivotally supported by a carriage 69. The carriage 69 is slidably supported in a guide member 71 shown in Figs. 2 and 9, the guide member being fixedly mounted on the base 32.

Figure 9:
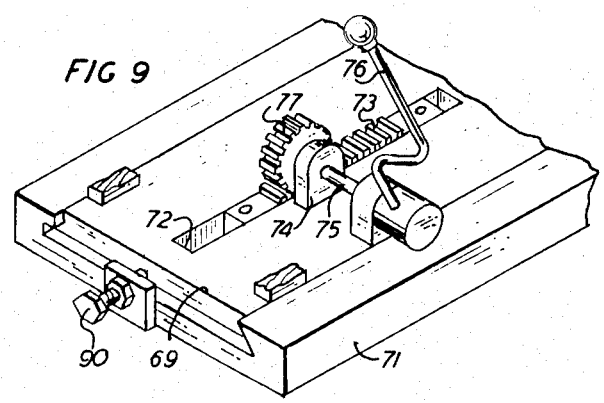
Fig. 9 is a fragmentary isometric view of the carriage moving means.

In Fig. 9 it would be noted that the carriage 69 has an elongate aperture 72 therein to receive a rack 73 which is fixedly mounted at a given position on the guide member 71. The carriage 69 also has spaced, vertically extending brackets 74 with aligned apertures or bearings to rotatably support a shaft 75, on one end of which is mounted a hand lever 76, while on the other end is mounted a pinion 77 disposed in interengagement with the rack 73. The rack 73 being fixed to the stationary guide member 71, rocking movement of the hand lever 76 in either direction will cause the pinion 77 to travel on the rack in the same direction to move the carriage 69 in similar directions.

Figure 1:
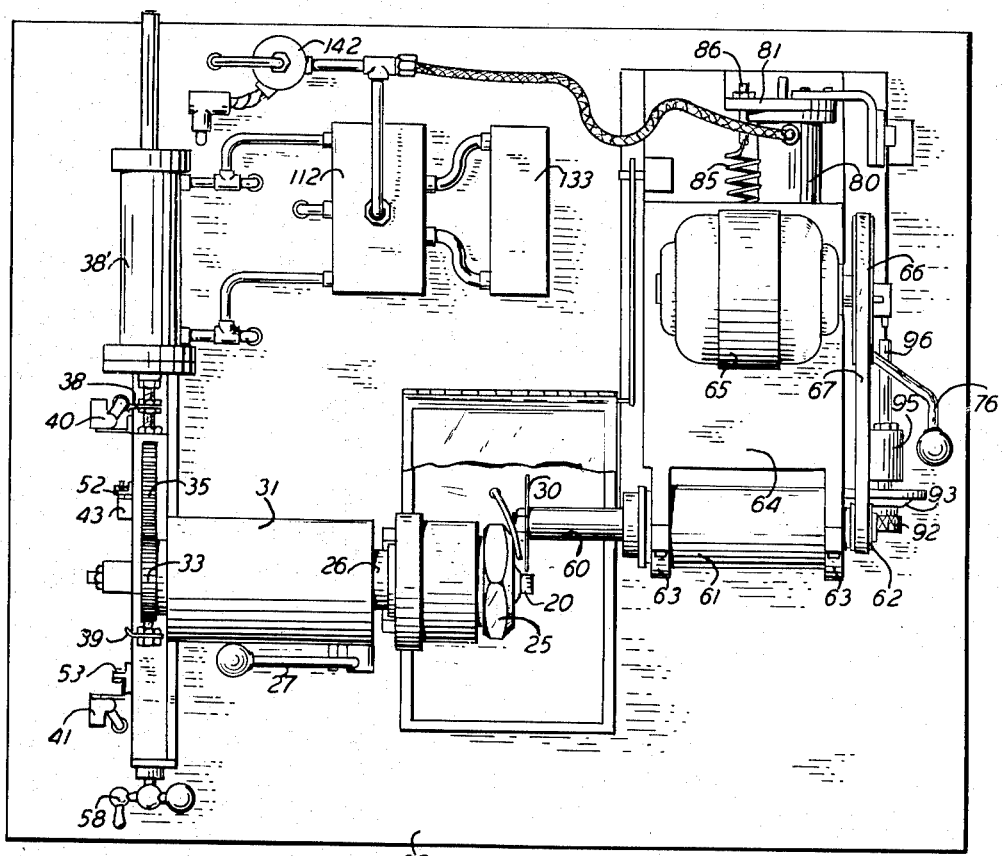
Fig. 1 is a top plan view of the apparatus.

A fluid cylinder 80 is mounted on a bracket 81, the bracket being fixedly mounted on the carriage 69. The piston 82 (Fig. 8) of the air cylinder 80 has a piston rod 83 disposed in engagement with a bracket-like projection 84 mounted on the undersurface of the table 64. The projection 84 is held against the outer end of the piston rod 83 by a spring 85 which has one end connected through an adjustable screw 86 (Fig. 1) to the bracket 81, while the other end is connected to the upper pivot 87 for the adjacent legs 68.

The forward or operating position of the carriage 69 is under the control of an adjustable stop 90 supported by a bracket 91 which is mounted on the base 32. The bracket 91 also supports a micrometer unit 92 having a dial 93 provided with suitable graduations and movable relative to a fixed pointer (not shown) preferably mounted at a given position on bracket 91 adjacent the dial. The micrometer unit includes a threaded shaft 94 movable in an internally threaded member 95 and having a portion 96 which projects longitudinally toward a switch 97 and is movable toward or away from the switch to control the depth of cut of the cutter 30 in the article 20. The switch 97 is normally closed and is supported by a bracket 98 mounted on a portion of the table 64. A normally opened switch 100, mounted on the base 32, is adapted to be actuated momentarily into closed position by a trigger-like cam 101, supported by an arm 102 mounted on the bracket 81, during movement of the carriage 69 into the operating position. The cam-like latch is pivotally supported and held against a stop 103 so that it will operate the switch 100 during movement of the carriage in the operating position only.

Figure 8:
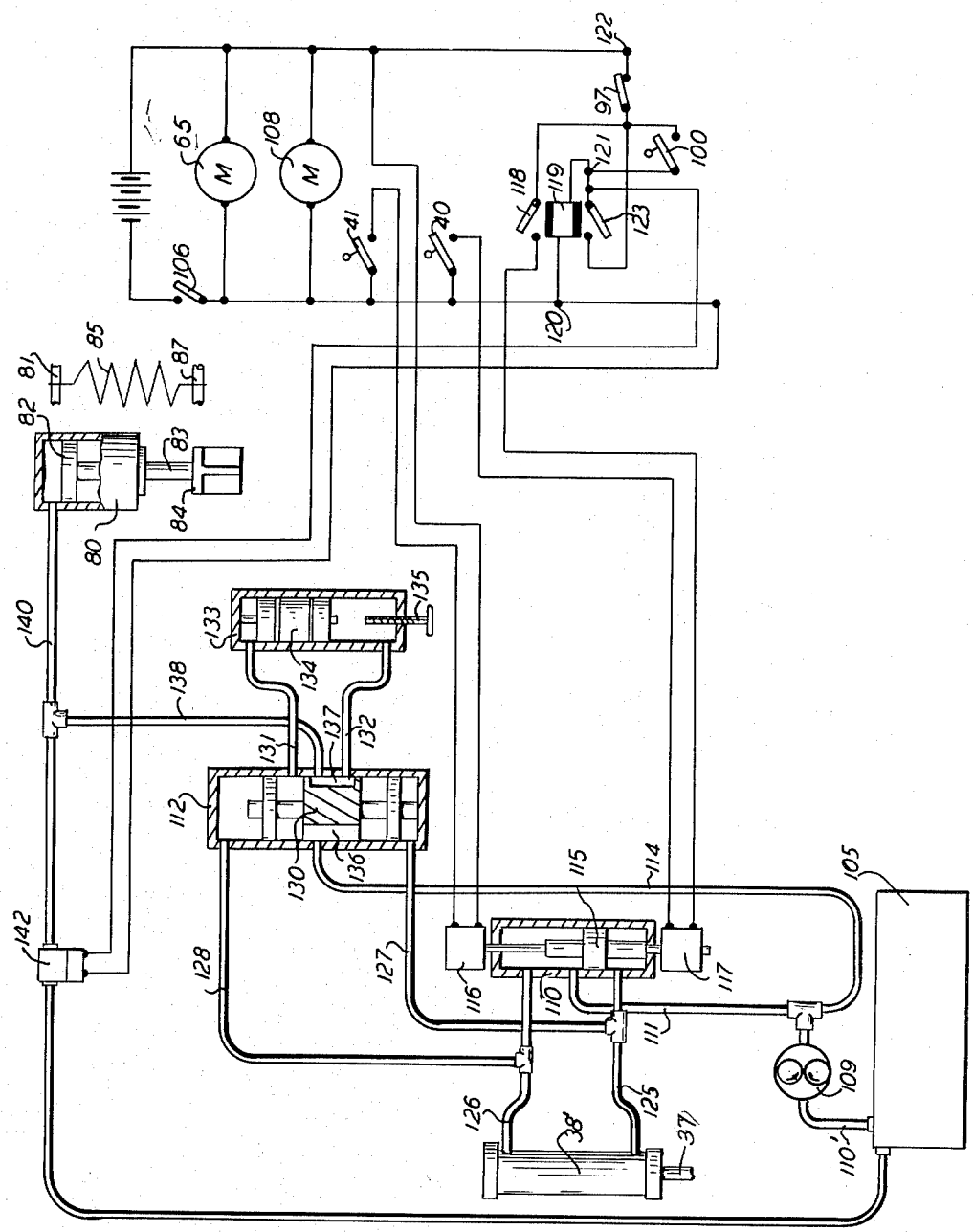
Fig. 8 is a schematic illustration of the electrical and hydraulic controls for the apparatus.

Attention is now directed to Fig. 8 which illustrates the hydraulic and electrical controls for the apparatus. In this figure there is a supply tank 105 for the fluid, such as oil, to be used in the hydraulic system. Attention is momentarily directed to the electrical circuit which illustrates a main switch 106 which, when closed, will cause continuous energizations of the motor 66 for the cutter 30 and a motor 108 for a fluid pump 109 connected to the supply 105 through a line 110'. The pump 109 is connected to a solenoid operated valve 110, through line 111 and to a valve 112 through line 114. The valve 110 has an element 115 under the control of solenoids 116 and 117. The solenoid 116 is in a circuit which is under the control of switch 41 so that whenever switch 41 is closed, the solenoid 116 will be energized.

The solenoid 117 is under the control of switch 40 and the upper contact 118 of a relay 119. This arrangement is needed to stop travel of the cutter 30 with the table and to assure return movement of the rack 35 to the back position regardless of its position at the end of the cutting operation. When switch 100 is closed, a circuit is completed from connection 120 through relay 119, connection 121, closed switch 100, normally closed switch 97 to connection 122. This will energize relay 119, closing top contact 118 and bottom contact 123. The bottom contact 123, when closed, will complete a locking circuit for the relay from connection 120 through relay 119, bottom contact 123 normally closed switch 97 to connection 122. In this manner, the top contact 118 will be held closed conditioning the circuit for energization of the solenoid 117 whenever the switch 40 is closed.

Referring now to the valve 110, it will be apparent that alternate energization of solenoids 116 and 117, through the alternate operation of switches 41 and 40, will result in alternate feeding of fluid through lines 125 and 126 to the respective ends of the cylinder 38' to cause reciprocation of the rack 35. Although it is not shown, a suitable means is provided to exhaust the fluids from the opposite ends of the cylinder 38'.

Lines 125 and 126 have fluid lines 127 and 128 connecting thereto, these lines leading to opposite ends of the valve 112, to cause alternate movement of the element 130 thereof to effectively connect line 114 alternately with fluid lines 131 and 132. The lines 131 and 132 lead from given positions in the cylinder of the valve 112 to opposing ends of a fluid measuring unit 133. The unit 133 has a piston-like element 134 movable varied distances under the control of an adjustable element 135 whereby measured quantities of the fluid may be forced alternately into the opposite ends of the cylinder 133. The element 130, having an open groove 136 at one side and a closed groove 137 at the other side, alternately connects the fluid line 114 and the fluid line 138 with the fluid lines 131 and 132. During the present illustration in Fig. 8, fluid line 114 is shown connected to fluid line 131, and fluid line 132 is connected to fluid line 138. However, upon movement of the element 130 to the opposite end of the cylinder, line 114 would be connected to line 132 and line 131 will be connected to line 138. In this manner, a measured quantity of the fluid is fed through line 138 and line 140 to the cylinder 80 back of the piston 82 to advance the cutter a given distance. At this time, attention is directed to a normally open valve 142 (Fig. 8) which is of the solenoid operable type included in a circuit with the bottom contact 123 and switch 97, whereby the line 140 will be held closed to the supply 105 during operation of the apparatus.

Considering now the operation of the apparatus, attention is first directed to the fact that the chuck is always returned to the starting position enabling the operator to readily position the article 20 in the chuck to locate the outermost notches 21 adjacent the ends of the rocking movements of the chuck about its axis. Prior to mounting of the article in the chuck, the hand lever 76 is moved clockwise to move the carriage 69 and the cutter 30 away from the chuck to enable the operator to more readily mount the article in the chuck. This apparatus was designed to gradually feed the cutter a measured distance after each rocking motion of the chuck which distance may be varied by varying the adjustable element 135 (Fig. 8). Also, the final depth of the cut may be varied depending on the thickness of the article by adjustment to the micrometer unit 92 relative to the switch 97.

Figure 2:
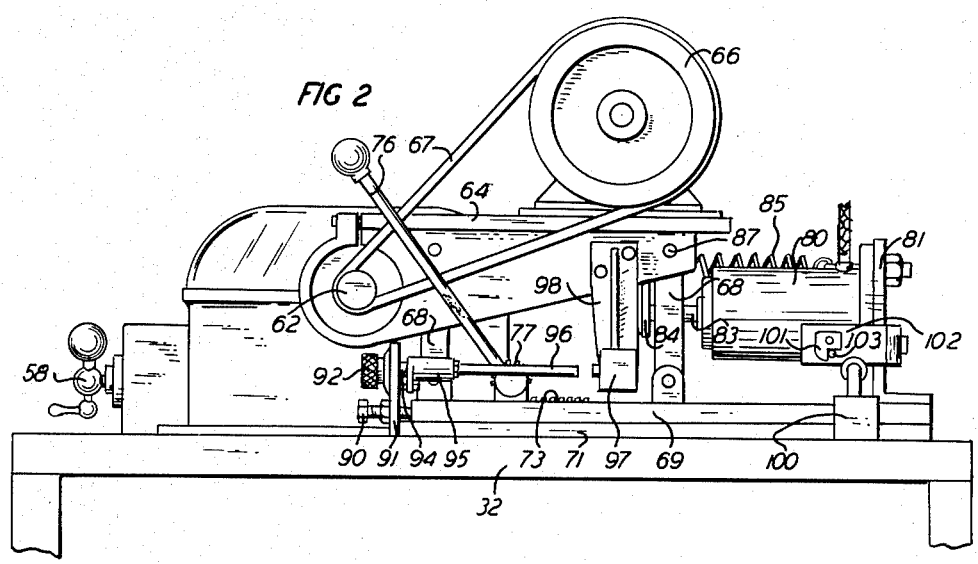
Fig. 2 is a side elevational view of the apparatus looking toward the right side of Fig. 1.

When the apparatus is set for the particular article, and this article is mounted in the chuck, the hand lever 76 is moved into the position, shown in Fig. 2, moving the carriage 69 against the adjustable stop 90. The switch 106 may be closed and the apparatus set in operation causing reciprocation of the plunger 37 of the air cylinder 38' to reciprocate the rack, applying motions thereto of given speeds with intervals of rest in between each motion while continued movements of the piston rod against the cushioning means, shown in Figs. 4 and 5, bring about alternate actuation of the switches 40 and 41 which, in addition to energizing the solenoids 116 and 117 to reciprocate the rack and rock the chuck between its variable limits, will operate the unit 112 to reciprocate its element. The intervals of rest for the rack, and thus for the chuck 25 and the article 20, occur when the projection 43 on the rack engages the stops 44 and 45, holding the rack at rest while the plunger 37 completes its strokes against the forces of the springs 46, Figs. 4 and 5, and until the plunger reverses its movement. Operation of the unit 12 results in measuring like quantities of liquid to be fed to the cylinder 80 back of the piston 82. These measured quantities of liquid move the piston 82 like distances after each rocking motion of the chuck and article to feed the cutter 30 a known distance toward the article so that after a given number of cutting operations, the excess portion of the article between the outer notches 21 will be removed.

Figure 10:
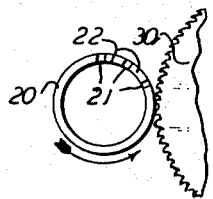
Figs. 10, 11, 12 and 13 illustrate the relative positions of the article and cutter during the cutting operations.
Figure 11:
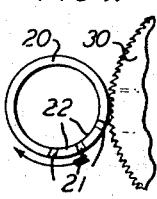
Figure 12:
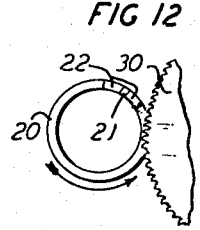
Figure 13:
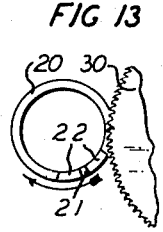

When the table 64 with the cutter has been moved the desired distance by the piston rod 83 to cause opening of the switch 97, the relay 119 will be de-energized rendering ineffective the switch 40. Should the rack be moving toward this switch, the rack will continue until the switch 40 is operated so that the chuck will come to rest at its starting position. If, however, the rack with the rod 37 should be moving toward the switch 41, it will continue and operate the switch 41 into closed position, causing its return to the opposite position adjacent the switch 40 so as to assure stopping of the chuck at the starting position. These operations of the chuck relative to the cutter are illustrated in Figs. 10 to 13, inclusive. Figs. 10 and 11 illustrate the article near the limits of its movement at the beginning of the cutting operation, while Figs. 12 and 13 illustrate the article near the limits of its rocking movement at substantially the end of the cutting operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for cutting circular articles comprising a rotatable cutter, a movable support therefor, a chuck adapted to removably hold a circular article relative to the cutter with the centerline of the article coincident with the axis of the chuck, means to support the chuck for rocking movement about its axis, means to rock the chuck about its axis, and means operable in timed relation with the rocking means and under the control thereof to move the support to feed the cutter a given distance toward the centerline of the article.

2. An apparatus for cutting circular articles comprising a rotatable cutter, a movable support therefor, a chuck adapted to removably hold a circular article relative to the cutter with the centerline of the article coincident with the axis of the chuck, means to support the chuck for rocking movement about its axis, means to rock the chuck about its axis, and means operable at the end of each rocking movement of the chuck and article to move the support to feed the cutter a given distance toward the centerline of the article.

3. An apparatus for making peripheral cuts in circular articles comprising a rotatable cutter, a movable support therefor, a chuck adapted to removably hold a circular article relative to the cutter, with the centerline of the article coincident with the axis of the chuck, means to support the chuck for rocking movement about its axis and to hold the chuck against axial movement, a pinion fixed to the chuck with its axis coincident with the axis of the chuck, a reciprocable rack interengaging the pinion, and means to reciprocate the rack to rock the chuck and article relative to the cutter while the cutter engages the article.

4. An apparatus for making peripheral cuts in circular articles comprising a rotatable cutter, a movable support therefor, a chuck adapted to removably hold a circular article relative to the cutter with the centerline of the article coincident with the axis of the chuck, means to support the chuck for rocking movement about its axis and to hold the chuck against axial movement, a pinion fixed to the chuck with its axis coincident with the axis of the chuck, a reciprocable rack interengaging the pinion, means to reciprocate the rack to rock the chuck and article relative to the cutter while the cutter engages the article, and means to vary the limits of movement of the rack to vary the limits of rocking motions of the chuck and article relative to the cutter.

5. An apparatus for making peripheral cuts in circular articles comprising a rotatable cutter, a movable support therefor, a chuck adapted to removably hold a circular article relative to the cutter with the centerline of the article coincident with the axis of the chuck, means to support the chuck for rocking movement about its axis and to hold the chuck against axial movement, a pinion fixed to the chuck with its axis coincident with the axis of the chuck, a reciprocable rack interengaging the pinion, and an element reciprocable between known limits to reciprocate the rack between shorter limits to rock the chuck and article relative to the cutter while the cutter engages the article.

6. An apparatus for making peripheral cuts in circular articles comprising a rotatable cutter, a movable support therefor, a chuck adapted to removably hold a circular article relative to the cutter with the centerline of the article coincident with the axis of the chuck, means to support the chuck for rocking movement about its axis and to hold the chuck against axial movement, a pinion fixed to the chuck with its axis coincident with the axis of the chuck, a reciprocable rack interengaging the pinion, an element reciprocable between known limits to reciprocate the rack between shorter limits to rock the chuck and article relative to the cutter while the cutter engages the article, and means actuable by the element adjacent its limits of movement to move the movable support and cutter toward the article.

7. An apparatus for making peripheral cuts in circular articles comprising a rotatable cutter, a movable support therefor, a chuck adapted to removably hold a circular article relative to the cutter with the centerline of the article coincident with the axis of the chuck, means to support the chuck for rocking movement about its axis and to hold the chuck against axial movement, a pinion fixed to the chuck with its axis coincident with the axis of the chuck, a reciprocable rack interengaging the pinion, an element reciprocable between known limits to reciprocate the rack between shorter limits to rock the chuck and article relative to the cutter while the cutter engages the article, a reversible unit operable to reciprocate the element, and means operable by the element adjacent its limits of movement to reverse the unit.

8. An apparatus for making arcuate peripheral cuts in circular articles comprising a rotatable cutter, a chuck adapted to removably hold a circular article relative to the cutter with the centerline of the article coincident with the axis of the chuck, means to support the chuck for rocking movement about its axis and to hold the chuck against axial movement, means actuable to repeatedly rock the chuck about its axis between given limits relative to the cutter to cause the cutter to make an arcuate peripheral cut therein, and means actuable to assure return of the chuck to a definite one of the limits at the completion of the cutting operation.

9. An apparatus for making arcuate peripheral cuts in circular articles comprising a rotatable cutter, means to feed the cutter for a given distance to the article, a chuck adapted to removably hold a circular article relative to the cutter with the centerline of the article coincident with the axis of the chuck, means to support the chuck for rocking movement about its axis and to hold the chuck against axial movement, means actuable to repeatedly rock the chuck about its axis between given limits relative to the cutter to cause the cutter to make an arcuate peripheral cut therein, means to stop feeding the cutter, and means actuable after stopping of the cutter feeding means to cause return of the chuck to a definite one of the limits.

References Cited in the file of this patent

UNITED STATES PATENTS

| | | |
|---|---|---|
| 1,669,919 | Trbojevich | May 15, 1928 |
| 1,870,764 | Aeppli | Aug. 9, 1932 |
| 2,022,061 | Tanner | Nov. 26, 1935 |
| 2,154,054 | Schurr | Apr. 11, 1939 |
| 2,258,510 | Laessker | Oct. 7, 1941 |
| 2,335,468 | Zwick | Nov. 30, 1943 |